United States Patent [19]
van der Pol

[11] Patent Number: 5,458,004
[45] Date of Patent: Oct. 17, 1995

[54] VOLUME FLOW METER

[75] Inventor: Ronald van der Pol, Venlo, Netherlands

[73] Assignee: Krohne Messtechnik GmbH & Co. KG., Germany

[21] Appl. No.: 297,594

[22] Filed: Aug. 30, 1994

[30] Foreign Application Priority Data

Sep. 1, 1993 [DE] Germany ............ 43 29 365.4
Sep. 8, 1993 [DE] Germany ............ 43 30 363.3

[51] Int. Cl.⁶ .................................................. G01F 1/66
[52] U.S. Cl. .................................... 73/861.29; 73/861.31
[58] Field of Search ................ 73/861.28, 861.29, 73/861.31

[56] References Cited

U.S. PATENT DOCUMENTS

| | | | |
|---|---|---|---|
| 3,940,985 | 3/1976 | Wyler | 73/861.31 |
| 3,987,674 | 10/1976 | Baumoel | 73/861.28 |
| 4,065,958 | 1/1978 | Krylova et al. | 73/861.28 |
| 4,365,518 | 12/1982 | Zacharias, Jr. | 73/861.31 |
| 4,838,127 | 6/1989 | Herremans et al. | 73/861.28 |
| 5,243,863 | 9/1993 | Gill | 73/861.28 |

Primary Examiner—Richard Chilcot
Assistant Examiner—Elizabeth L. Dougherty
Attorney, Agent, or Firm—Cesari and McKenna

[57] ABSTRACT

In a volume flow meter with a measuring line, a first measuring head and a second measuring head, the flow volume can be measured more simply and more reliably using evaluation technology by having the measuring line made of a material that transmits an acoustic signal given off by one of the measuring heads at a slower sound velocity than the fluid.

6 Claims, 2 Drawing Sheets

VOLUME FLOW METER

FIELD OF THE INVENTION

The invention concerns a volume flow meter for measuring the flow volume of fluids, with a measuring line, a first measuring head and a second measuring head.

BACKGROUND OF THE INVENTION

Many industrial applications require precise determination of the volume of fluid flowing through a measuring line. The volume of fluid can be calculated from the cross section of the measuring line and the flow speed of the fluid. Determining the cross section of the line is easy, since it is preset. Hence, precise measurement of flow speed is decisive in accurately determining flow volume. On the one hand, the measured value of the flow speed must be precise and, on the other hand, it may be necessary to take a continuous measurement or repeat measurements at the shortest possible time intervals, since short-term fluctuations in flow speed can occur. In order to include these fluctuations in the calculation of the flow volume over a longer period of time, the total flow volume is determined by adding the flow volume within short periods of time.

In the state of the art (H. Bernard, "Ultraschall-Durchflussmessung" in Das Handbuch für Ingenieure", Bonfig/Bartz/Wolff, 2nd Edition), on which the invention is based, the flow speed of the fluid is measured by sending an acoustic signal along a set measuring path. In this way, the timing of the acoustic signal on the measuring path from an acoustic sender to an acoustic receiver in the fluid is determined by the sound velocity and the flow speed (drag). The principle of acoustic flow measurement by the time difference method is derived from this. In the fluid, acoustic signals are sent upstream and downstream alternately or simultaneously. Because of the different diffusion speed, the acoustic signals reach the acoustic receiver after different times $t_1$ and $t_2$ upstream and downstream on the same length measuring path. The difference $t_2-t_1$ is a measurement of the average flow speed on the measuring path formed by the acoustic sender and receiver. The senders are excited to oscillate by an electrical voltage and give off an acoustic signal in the fluid. The acoustic receivers receive this signal after it runs along the measuring path and convert it into an electrical voltage. The time difference is detected from the acoustic signal times found in this way, and is proportional to the flow speed of the fluid in the measuring line.

In the state of the art, two measuring heads are placed on a measuring line in such a way that their connecting line has a component parallel to the direction of the flow speed. The measuring heads are either placed in contact with the fluid in the measuring line or attached to the measuring line from outside with no contact with the fluid. The measuring heads each contain a piezoelectric transducer, with which the acoustic signal necessary for flow measurement is produced and received (acoustic receiver). If a high-frequency alternating voltage is applied to the two surfaces of the piezoelectric transducer that have electrically conductive layers, the piezoelectric transducer periodically changes its thickness at the same frequency and is capable of producing sound waves in the surrounding medium. This process is reversible, so that acoustic signals running from the sender through the fluid to a piezoelectric transducer of the second measuring head produce a thickness oscillation therein which produces an electrical alternating voltage in the piezoelectric transducer of the second measuring head. This is amplified and further processed by known electronic elements.

Moreover, in the state of the art, direct time measurement by the "leading edge" method is used for the time difference method. For this, a precisely defined, pulsed acoustic signal is sent from a first measuring head to a second measuring head, wherein to measure the time $t_1$, only the first sharp, precisely definable side of the pulsed acoustic signal is used. At the same time, an acoustic signal is sent from the second measuring head to the first measuring head and the time $t_2$ is measured in the same way. The time difference $t_2-t_1$ is directly linearly proportional to the average flow speed; other parameters like, for example, the temperature-dependent density and viscosity, are not included in the measurement.

In addition to the acoustic signal sent from the fluid as a measuring signal, an acoustic signal occurs as an interfering signal due to the transmission of the acoustic signal through the material of the measuring line. In the known volume flow meters, the measuring line is made of metal, in which the sound velocity is greater than in fluid. The sound velocity for metals is in the range of 4,000–5,000 m/s and for fluids in the range of 1,500 m/s. The acoustic signal to be regarded as an interfering signal is thus received by the acoustic receiver before the acoustic signal to be evaluated as a measuring signal, so that the measuring signal is superimposed over the interfering signal. This superposition thus occurs especially at the beginning of the measuring signal used as a measurement for determining the running time, as described above. The intensity of the interfering signal is generally the same size or greater than the measuring signal, since the acoustic signal is transmitted very well through metal. This also makes it difficult to determine the running time of the measuring signal.

In the state of the art, attempts have been made in various ways to suppress the interfering signal using evaluation technology. One possibility consists of the fact that a time window is set up in which the interfering signal occurs regardless of the flow speed at constant running time, while the acoustic signal received by the respective acoustic receiver is suppressed. But it must be guaranteed that, in each case, there is a sufficient running time difference between the interfering signal and the measuring signal. In the state of the art, the known volume flow meters must, therefore, have a long enough measuring path. Another way of suppressing the interfering signal is by setting an intensity threshold from which the output signal produced by the acoustic receiver is evaluated. Here, however, it must be guaranteed that the intensity of the measuring signal is greater than that of the interfering signal. But this is problematic, as already described above.

SUMMARY OF THE INVENTION

The invention thus sets itself the task of designing and further developing the known volume flow meter so that flow volume can be measured more simply and reliably using known evaluation technology.

The task indicated above is solved in the invention by having the measuring line composed of a material that transmits an acoustic signal given off by one of the measuring heads at a slower sound velocity than the fluid. According to the invention, it was thus recognized that by using a suitable material for the measuring line, the acoustic signal to be regarded as an interfering signal has a longer running time than the acoustic signal to be evaluated as a measuring signal. This guarantees that in each case, the measuring signal to be evaluated is received by the respective acoustic receiver before the interfering signal. Since evaluation of the measuring signal consists of determining the start of the measuring signal, any potential superposition of the measuring signal by the interfering signal that then occurs is insignificant in determining the running time of the measuring signal.

Another advantage of the volume flow meter of the invention lies in the fact that the measuring path can be shortened compared to the state of the art, since the measuring signal is received before the interfering signal by the respective acoustic receiver regardless of the length of the measuring path. The result is thus a more compact design, which offers advantages when the volume flow meter of the invention is used in small facilities or equipment.

Plastic is preferably used as the material for the measuring line, especially PFA. The sound velocity in plastic is in the range of 1,000 m/s, hence clearly less than the sound velocity of roughly 1,500 m/s for fluids already mentioned above.

Now there are various ways of designing and further developing the theory of the invention, which may be referred to in the claims subordinate to patent claim 1, on one hand, and in the explanation of a preferred embodiment along with the drawing, on the other.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENT

Figure 1:
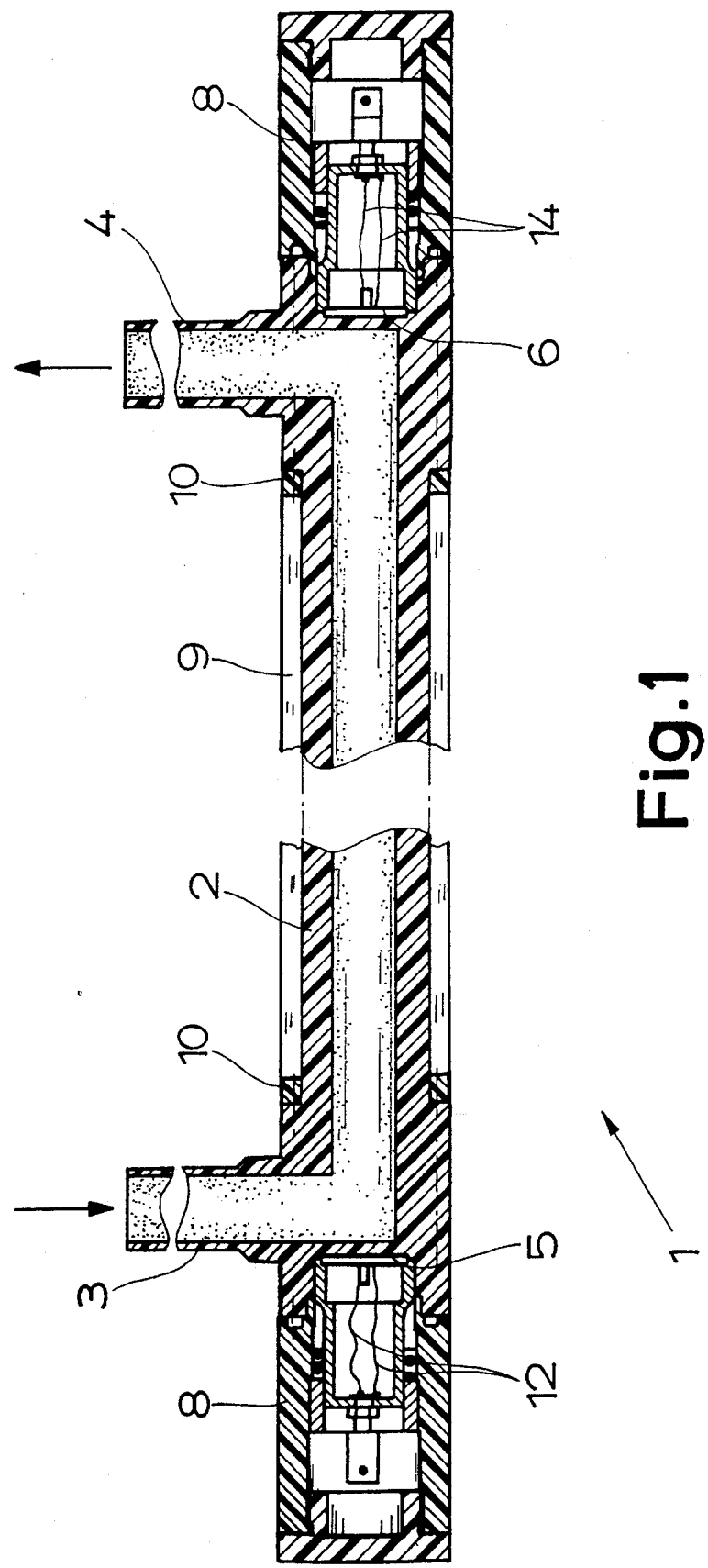
FIG. 1 is a cross sectional view of a preferred embodiment of a volume flow meter according to the invention.
Figure 2:
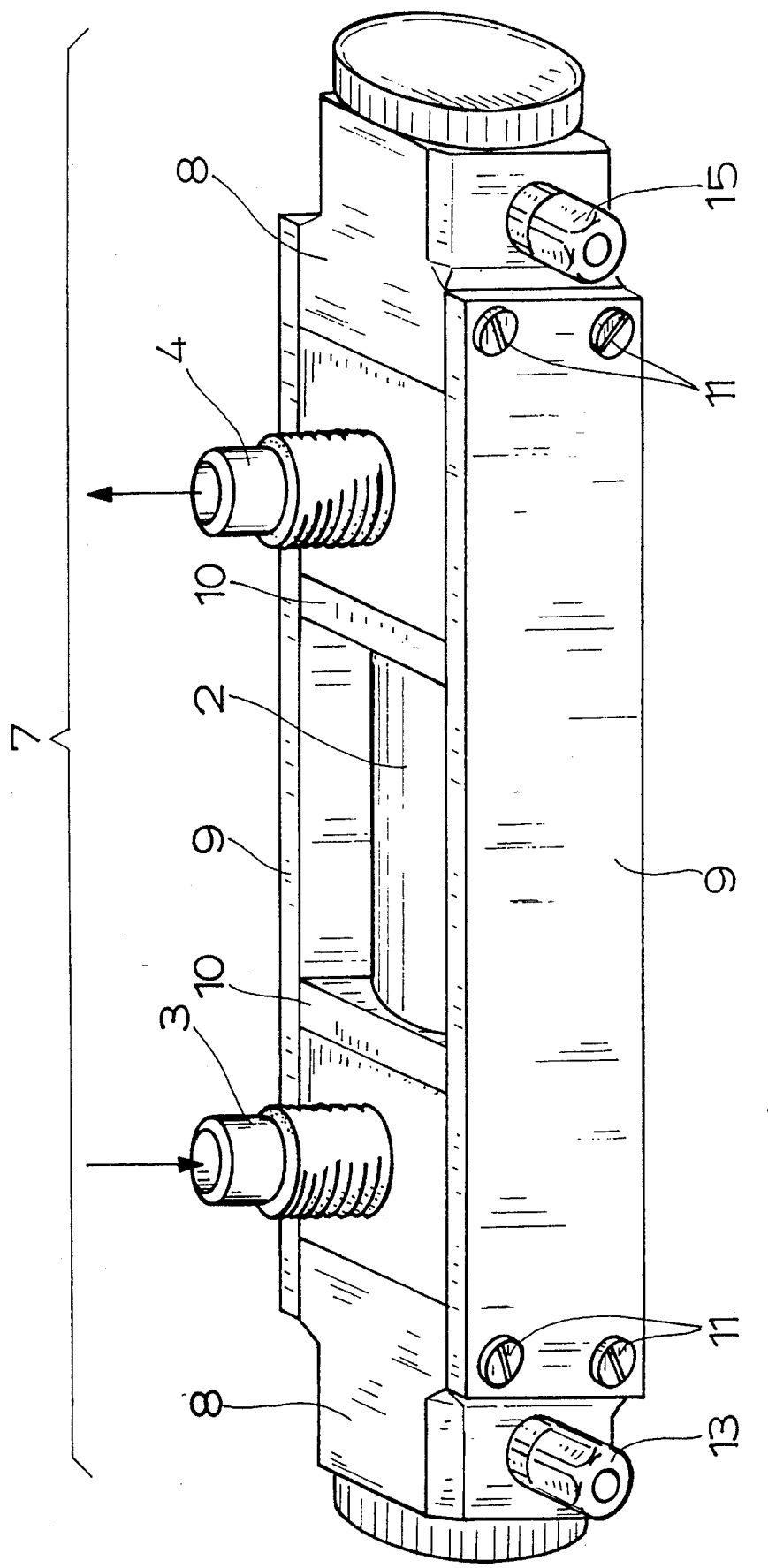
FIG. 2 is a perspective view of the volume flow meter in FIG. 1.

A preferred embodiment of a volume flow meter 1, in which the theory of the invention is embodied, is shown in FIGS. 1 and 2. The volume flow meter 1 has a measuring line 2, in which a fluid flows in through a supply line 3 and flows out through a drainage line 4. On one end of the measuring line 2, there is a first measuring head 5 and on the other end of the measuring line 2, there is a second measuring head 6.

According to the invention, the measuring line 2 is made of a material that transmits the acoustic signal at a slower sound velocity than the fluid. This results in a longer running time of the acoustic signal transmitted over the measuring line 2, which is the interfering signal, compared to the acoustic signal transmitted through the fluid, which is the measuring signal.

As best seen in FIG. 2, in the embodiment shown there, the measuring line 2 is made of plastic, preferably of PFA. The measuring line 2 and the two measuring heads 5 and 6 are in a frame-like meter housing 7, which is made up, on one hand, of sensor housings 8 and, on the other, of side plates 9. The sensor housings 8 are used to protect the measuring heads 5 and 6, while the side plates 9 are used to stabilize the volume flow meter 1. The frame-like meter housing 8, of course, also transmits the acoustic signal, so that the sensor housing 8 and the side plates 9 are also made of plastic, preferably of CTFE.

Clamping plates 10 encompassing the measuring line 2 are also provided. The measuring line 2 and the sensor housings 8 are braced to one another by clamping screws (not shown) that are supported on the clamping plates 10 and go into the sensor housings 8. The side plates 10 are connected to the sensor housings 8 with the screws 11 that attach to the sensor housings 8.

The two measuring heads 5 and 6 each contain conventional piezoelectric transducers which function both as acoustic senders and receivers in the way described above. For this, the input and output signals necessary to operate the measuring head 5 are fed in and out over electric lines 12 that go into the associated sensor housing 8 via a cable duct 13. This happens in the same way with the measuring head 6 via electric lines 14 that go into the sensor housing 8 for that head through a cable duct 15.

The time difference method is now carried out in the following way. A pulsed acoustic signal is given off at the same time by both measuring heads 5 and 6; both measuring heads 5 and 6 thus function simultaneously as acoustic senders. Then, both measuring heads 5 and 6 are switched over to receive so that they can receive the acoustic signal given off by the other measuring head 6 and 5.

The evaluation signals used in evaluation electronics, which have been produced by the measuring heads 5 and 6, are now evaluated in the following way: the start of production of the acoustic signal with the measuring heads 5 and 6 is determined using the known "leading-edge" method described above, and a first and second counter, set back ahead of time, are set in motion. The first counter is stopped as soon as the first acoustic signal is received by the measuring head 6. The counter status thus gives a measurement of the running time $t_1$ of the acoustic signal that was given off by the measuring head 5. In the same way, the counter status of the second counter is used to determine the running time $t_2$ of the acoustic signal that was sent out by the measuring head 6. Since the running time difference $t_2-t_1$ is directly proportional to the flow speed, the flow volume of the fluid can be calculated from it.

In the volume flow meter of the invention, because of the fact that the measuring signal, i.e., an acoustic signal through the fluid in the measuring line 2, has a shorter running time than the interfering signal, i.e., the acoustic signal through the measuring line 2 and the meter housing 7, each first acoustic signal measured can be used to determine the running time of the measuring signal. It is therefore no longer necessary to suppress the interfering signal, as in the state of the art, using time windows or signal thresholds. Measurement of the flow speed of the fluid in the measuring line 2 has therefore been substantially simplified.

Finally, it should be pointed out that the acoustic signals do not cross the measuring line 2; rather they diffuse in the direction of the longitudinal axis of the measuring line 2, because the measuring heads 5 and 6 are provided on both ends of the measuring line 2.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described.

What is claimed is:

1. A volume flow meter for measuring the flow volume of a fluid by determining the difference in the travel times of at least two pulsed acoustic signals, said meter being of the type including a measuring line (2), a first measuring head (5), and a second measuring head (6), wherein a first sharp, precisely definable leading edge of the pulsed acoustic signal transmitted by one of the measuring heads (5,6) is used for the direct time measurement, the two acoustic signals are transmitted through the fluid as a measuring signal as well as through the material of the measuring line (2) as an interfering signal at least partially interfering with the measuring signal, and the measuring line (2) is made of a material that transmits an acoustic signal at a slower sound velocity than the fluid transmits said signal.

2. The volume flow meter according to claim 1 wherein the measuring line (2) is of plastic.

3. The volume flow meter according to claim 1 or 2 and further including a frame-like meter housing (7) for housing the measuring line (2) and the measuring heads (5,6).

4. The volume flow meter according to claim 4 wherein the meter housing (7) is of plastic.

5. In a volume flow meter for measuring the flow volume of a fluid by determining the difference in the travel times of at least two signals, said meter being of the type including a measuring line (2), a first measuring head (5) and a second measuring head (6), the improvement wherein the measuring line (2) is made of PFA plastic material that transmits an acoustic signal transmitted by one of the measuring heads (5,6) at a lower sound velocity than the fluid transmits said signal.

6. In a volume flow meter for measuring the flow volume of a fluid by determining the difference in the travel times of at least two signals, said meter being of the type including a measuring line (2), a first measuring head (5) and a second measuring head (6), the improvement wherein the measuring line (2) is made of a material that transmits an acoustic signal transmitted by one of the measuring heads (5,6) at a lower sound velocity than the fluid transmits said signal and further including a frame-like meter housing (7) for housing the measuring line (2) and the measuring heads (5,6), said meter housing being of CTFE plastic material.

* * * * *

UNITED STATES PATENT AND TRADEMARK OFFICE
CERTIFICATE OF CORRECTION

PATENT NO. : 5,458,004
DATED : October 17, 1995
INVENTOR(S) : Ronald van der Pol It is certified that error appears in the above-identified patent and that said Letters Patent is hereby corrected as shown below:

Column 5:
    Claim 4, line 1, change "4" to —3—.

Signed and Sealed this

Ninth Day of January, 1996

BRUCE LEHMAN

Attest:

Attesting Officer    Commissioner of Patents and Trademarks